United States Patent [19]
Taruki

[11] Patent Number: 5,784,680
[45] Date of Patent: Jul. 21, 1998

[54] COMPACT AUTO-DOCUMENT FEEDER FOR AN IMAGE FORMING APPARATUS

[75] Inventor: Takashi Taruki, Hiratsuka, Japan

[73] Assignee: Ricoh Company, Ltd., Tokyo, Japan

[21] Appl. No.: 728,988

[22] Filed: Oct. 11, 1996

[30] Foreign Application Priority Data

Oct. 11, 1995 [JP] Japan .................. 7-263388
Oct. 12, 1995 [JP] Japan .................. 7-263776

[51] Int. Cl.[6] .................................. G03G 21/00
[52] U.S. Cl. ................. 399/374; 399/364; 271/391
[58] Field of Search ....................... 399/374, 373, 399/364, 361; 271/291

[56] References Cited

U.S. PATENT DOCUMENTS

| | | | |
|---|---|---|---|
| 4,508,447 | 4/1985 | Doery | 271/3.1 X |
| 4,881,729 | 11/1989 | Culligan et al. | 271/3.1 |
| 4,884,794 | 12/1989 | Dinatale | 271/3 |
| 4,921,239 | 5/1990 | Okui et al. | 271/186 |
| 4,934,681 | 6/1990 | Holmes et al. | 271/3.1 X |
| 4,974,827 | 12/1990 | Arai et al. | 271/265 |
| 5,010,373 | 4/1991 | Linssen et al. | 271/3.1 X |
| 5,197,724 | 3/1993 | Kitajima et al. | 271/3.1 |
| 5,401,012 | 3/1995 | Takuri . | |
| 5,436,715 | 7/1995 | Yamada et al. . | |
| 5,438,435 | 8/1995 | Lawniczak | 358/496 |
| 5,486,911 | 1/1996 | Rubscha et al. | 271/213 X |
| 5,502,556 | 3/1996 | Yamada . | |
| 5,597,153 | 1/1997 | Maruyama et al. | 399/374 X |

Primary Examiner—R. L. Moses
Attorney, Agent, or Firm—Oblon, Spivak, McClelland, Maier & Neustadt, P.C.

[57] ABSTRACT

A compact ADF (auto-document feeder) for feeding a duplex document includes, a first feeding path starting from a document setting table to an exposing area and is formed in a U-shaped state, a second feeding path starting from the exposing area to an ejecting roller, a switch-back path disposed downstream of the second feeding path and above a document ejecting tray, and an inverting path starting from an entrance of the switch-back path to the first feeding path. A switching gate is pivotally disposed downstream of the second feeding path and above the ejecting tray to selectively lead the document either to the ejecting tray, or the switch-back path, or to the inverting path each from the second feeding path.

14 Claims, 6 Drawing Sheets

COMPACT AUTO-DOCUMENT FEEDER FOR AN IMAGE FORMING APPARATUS

BACKGROUND OF THE INVENTION

1. Field of the Invention

The present invention is related to an Auto-Document Feeder (hereinafter referred to as an ADF) for a duplex document for an image forming apparatus, for example, a copier, a printer, a facsimile, etc.

2. Discussion of the Background

A related ADF for a duplex document employs a pair of switch-back rollers at the end of a document feeding path and an inverting path elongating from the switch-back roller to a exposing area.

Namely, the document having been exposed at one side thereof is switch backed by the pair of rollers rotating in a predetermined direction and fed to the exposing area again.

After both sides of the document have been exposed, the document is ejected by the switch-back roller, rotating in a different direction onto an ejecting tray.

Thus, the inverting path requires enough of a length to avoid a conflict of the document being fed for the second exposing at the pair of the switch-back rollers. This causes a problem in that the ADF becomes too wide.

SUMMARY OF THE INVENTION

Accordingly, an object of the present invention is to minimize a width of the ADF for the duplex document for the image forming apparatus.

The present invention therefore relates to an auto-document feeder for an image forming apparatus which has at least a platen glass and document reading means for a duplex document. The auto-document feeder comprises a document setting table on which the duplex document is set in order of the pages thereof; a separating and feeding means for separating documents set on the document setting table and feeding the document forward from an upmost document thereon; a first feeding path which extends from the document setting table to the platen glass for leading and turning the document; an ejecting tray for receiving the document after both sides of the document have been read by the document reading means; ejecting roller for ejecting the document onto the ejecting tray; a second feeding path which extends from the platen glass to the ejecting rollers; a switch-back patch for receiving the document from the second path, the switch-back path having switch-back rollers therein; a switching gate for switching a feeding direction of the document to either the switch-back path or the ejecting tray; and a third feeding path for leading the document from the switch-back path to a part of the first feeding path. The switching gate is disposed downstream of the ejecting roller and above the ejecting tray.

The present invention also relates to an image forming apparatus which comprises an image forming machine for forming a duplex or a simplex copy. The image forming machine has a slit glass platen and a wide glass platen both on top of the image forming machine and a reading means for reading a document on the slit glass platen or wide glass platen. The apparatus also comprises an auto-document feeder for a duplex document having a document setting table on which the duplex document is set in order of the pages thereof; a separating and feeding means for separating documents set on the document setting table and feeding the document forward from an upmost document thereon; a first feeding path which extends from the document setting table to the platen glass for leading and turning the document; an ejecting tray for receiving the document after both sides thereof have been read by the reading means; a pair of ejecting rollers for ejecting the document onto the ejecting tray; a second feeding path which extends from the platen glass to the pair of ejecting rollers; a switch-back path for receiving the document from the second path disposed downstream of the ejecting rollers and above the ejecting tray, and which has a pair of switch-back rollers therein; a switching gate for switching a feeding direction of the document either to the switch-back path or the ejecting tray and which is disposed downstream of the ejecting roller and above the ejecting tray; and a third feeding path for leading the document from the switch-back path to a part of the first feeding path. The ejecting tray, the switch-back path and the document setting table are disposed above the wide glass platen.

The present invention also relates to an auto-document feeder for a duplex document which comprises a document setting table on which the duplex document is set in order of pages thereof; a separating and feeding means for separating documents set on the document setting table and feeding the document forward from an utmost document thereon; a first feeding path which extends from the document setting table to the platen glass for leading and turning the documents; an ejecting tray for receiving the document after both sides thereof have been read by the reading means; ejecting rollers for ejecting the document onto the ejecting tray; a second feeding path which extends from the platen glass to the ejecting rollers; a switch-back path for receiving the document from the second path, and which has switch-back rollers therein; a first switching gate for switching a feeding direction of the document to either the switch-back path or the ejecting tray and is disposed downstream of the ejecting roller and above the ejecting tray; a third feeding path for leading the document from the switch-back path to a part of the second path and which is disposed around the ejecting rollers; and a second switching gate for switching a feeding direction of a document fed from the switch-back path and lead the document into the third feeding path.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, wherein.

DESCRIPTION OF THE PREFERRED EMBODIMENTS

Figure 1:
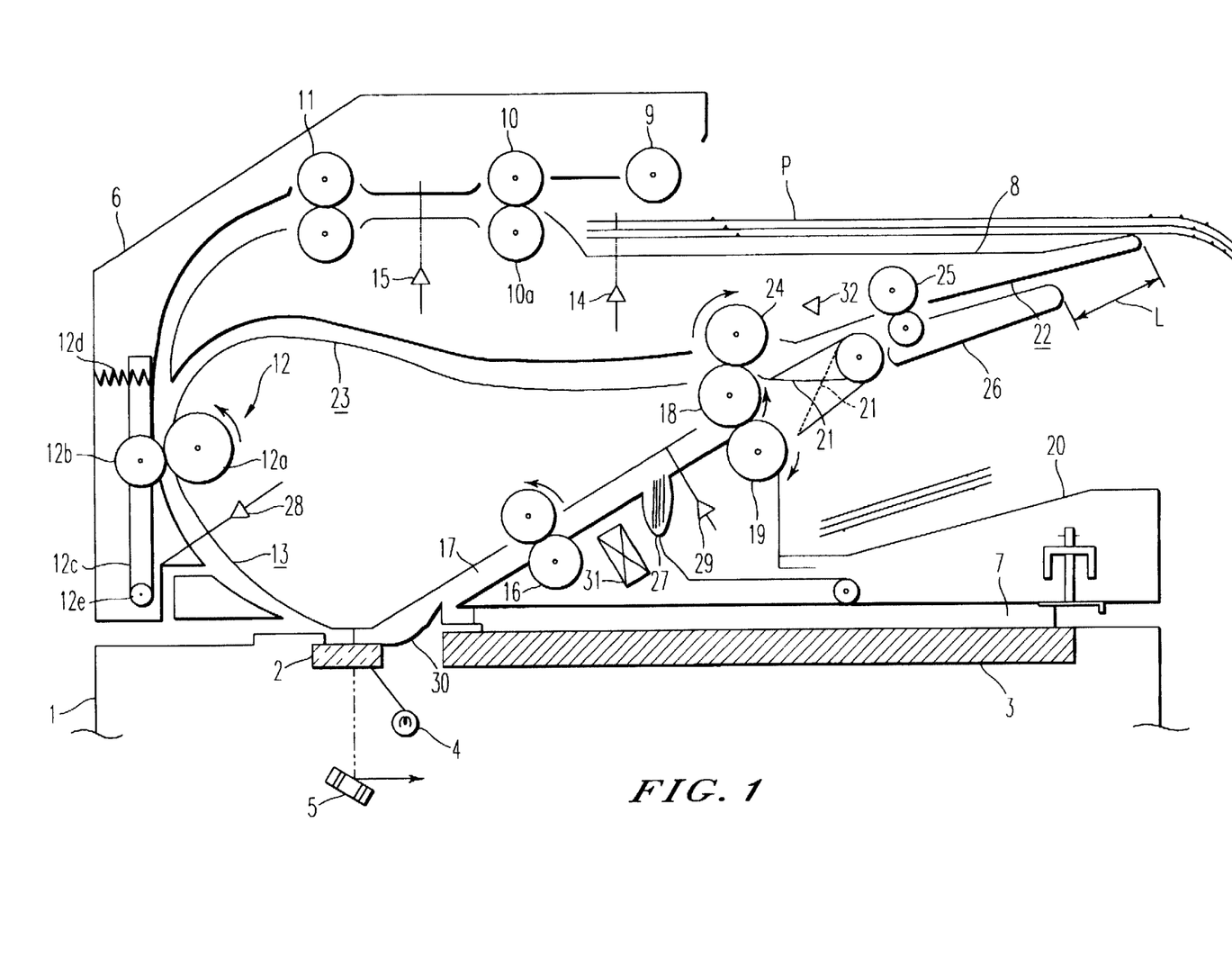
FIG. 1 is a cross sectional view of the whole structure of the ADF for the image forming apparatus of the present invention.
Figure 2:
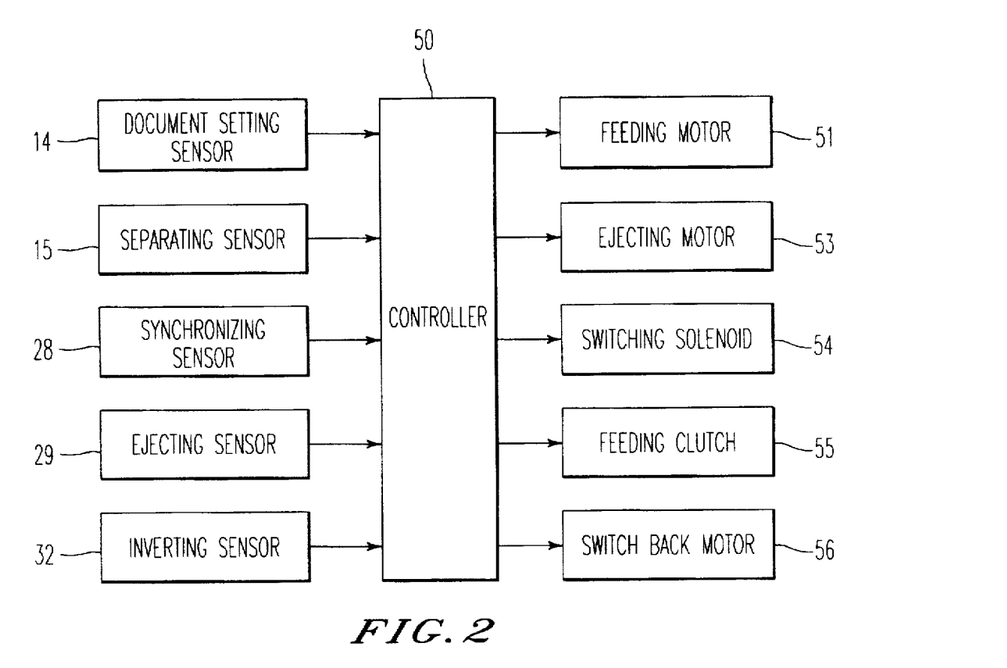
FIG. 2 is a block diagram showing a control of the ADF of the present invention.

Referring now to the drawings, wherein like reference numerals designate identical or corresponding parts throughout the several views, in FIGS. 1 or 2, an image forming apparatus 1 is disposed which includes a slit glass 2 and a contact glass 3. The image reading apparatus 1 further includes an exposing lamp 4 and a first mirror 5 disposed below the glasses 2 and 3. Both the lamp 4 and the mirror 5 move from left to right below the contact glass 3 in the case when the document laying on the contact glass 3 is read. On the other hand, the lamp 4 and the mirror 5 are positioned stationary below the slit glass 2 in the case when the document passing through the slit glass 2 is read. Also, a reflected light from the document is further reflected by the mirror 5 and focused on a CCD, not shown in the figures.

An ADF 6 is mounted on the image forming apparatus 1 and has a white board 7 at an inner surface thereof so that it presses the document laying on the contact glass 3 thereto and gives a white level reference at the time the ADF is closed. A document setting tray 8 is formed at the outer surface of the ADF 6 to stack the document P therewith. A pick up roller 9 is disposed above the tray 8 to contact the upmost document to feed the same and apart therefrom. A pair of separating rollers 10 are disposed downstream of the pick up roller 9 to allow only one document to pass therethrough.

A first transfer path 13 is formed from the document tray 8 to the slit glass 2. In the path 13, a pair of pull out rollers 11 and a pair of transfer rollers 12 are disposed to transfer and turn the document and bring the same to the slit glass 2. The pair of transfer rollers 12 includes a driving roller 12a and a follower roller 12b which is supported by a lever 12c. The lever 12c has an axis 12e and is biased by a spring 12d toward the driving roller 12a so that the follower roller 12b is pressed against the driving roller 12a.

A feeding motor 51 (FIG. 2) is employed to drive the above mentioned rollers 9, 10, 11 and 12. A roller 10a is driven via a feeding clutch 55 and the clutch 55 is controlled by a signal generated by a controller 50 in a manner that the roller 10a is not driven by the feeding motor 51 but rotated by the passing document, when a leading document is separated by the separating roller 10.

A set sensor 14 is disposed under the document tray 8 to sense the presence of the document thereon, and generates a signal and inputs the same to the controller 50. A separating sensor 15 is disposed on the first path 13 and between the pair of separating rollers 10 and the pair of the pull-out rollers 11 to sense completion of the separating of the document fed by the pick up roller 9. The controller 50 controls the feeding clutch 55 not to transmit the driving force of the feeding motor 51 to the roller 1a.

A second transfer path 17 is formed downstream of the slit glass 2. A pair of assisting rollers 16 are disposed on the path 17 and feed the document having been completed of the reading thereof at the slit glass 2 along the path 17. An ejecting tray 20 is disposed downstream of the path 17 and above the wide platen glass 3 to receive and stack the documents thereon. An ejecting roller 18 and a first follower roller 19 are disposed at the end of the path 17 contacting with each other, so that the document is nipped therebetween and ejected onto the tray 20. An ejecting motor 53 is employed and the ejecting roller 18 is driven in a predetermined direction by the ejecting motor 53.

A switching gate 21 is disposed downstream of the ejecting roller 18 and the first follower roller 19. A switch-back path 22 is disposed downstream of the switching gate 21, below the document setting table 8 and above the ejecting tray 20. An inverting path 23 is disposed downstream of the switch-back path 22. The gate 21 is swingable between a first position as illustrated by the solid line shown in FIG. 1, where it leads the document onto the ejecting tray 20, and a second position as illustrated by the dotted line shown in FIG. 1 where it leads the document toward the switch-back path 22 and after that leads the same toward the inverting path 23. A solenoid, not shown in the figures, is employed and the switching gate 21 is connected therewith. The solenoid is controlled by the controller 50 in a manner that if a signal is generated from the controller 50 the solenoid pushes the switching gate 21 to move the position from the position as illustrated by the dotted line to that of the solid line as shown in FIG. 1.

The inverting path 23 is positioned above the second path 17 and is elongated from the switch-back path 22 to the first path 13 as shown in FIG. 1. A second follower roller 24 is disposed in a state of contacting with the ejecting roller 18, and further feeds the document fed from the switch-back path 22 toward the inverting path 23.

A pair of the switch-back rollers 25 are disposed in the switch-back path 22. A switch-back driving motor 56, not shown in the figures, is provided and the pair of the switch-back rollers 25 are driven both in a clockwise and counter-clockwise direction by the motor 56. A guiding plate 26 is disposed downstream of the switching gate 21. The switch-back path 22 is defined by the plate 26 and a flared member of the document setting tray 8 of the ADF. The guiding plate 26 is made with a shorter length by an amount L than the document setting tray 8. The length L is preferably determined to be from 100 mm to 150 mm. A discharging brush 27 is disposed on the second path 17 to discharge the static electricity remaining on the document.

A synchronizing sensor 28 is disposed on the first path 13. The sensor 28 detects both the leading edge and the trailing edge of the document, and generates each of the signals and inputs each of the same to the controller 50.

An ejection sensor 29 is disposed on the second path 17. The ejection sensor 29 detects both the leading edge and the trailing edge of the document, generates each of the signals and inputs the same to the controller 50.

The controller 50 controls the driving of the feeding motor 51 and the feeding clutch 55 each in response to the document detection by the document setting sensor 14 and the separating sensor 15.

The controller 50 also controls the driving of the driving motor 51, the ejection motor 53 the switching solenoid 54 and the switch-back motor 56 as mentioned later. A stamping member 31 is disposed beside the second path 17 and downstream of the slit glass 2 to stamp a mark indicative of completion of the reading of one side of the document. An inclining guide 30 is disposed just downstream of the slit glass 2 to lift and lead the document to the second path 17. An inversion sensor 32 is disposed above the switch-back path 22 to detect both of the leading and trailing edges of the switching back document and to input the detection signal into the controller unit 50.

Hereinafter, both a simplex document feeding mode and a duplex document feeding mode are explained in detail.

First, the simplex document feeding mode is explained. When stack P of the simplex documents is set on the document setting tray 8, the setting sensor 14 detects the presence of the stack P and sends the presence signal into the controller 50. If, a copy start key disposed in an operation panel, not shown in the figures, of the copy machine 1 is actuated, the controller 50 starts controlling the feeding motor 51 so that feeding and separating of the document is executed.

Namely, the document stack P is fed by the pick up roller 9 and separated by the pair of separating rollers 10. The document is further fed both by the pair of pull out rollers 11 and the pair of transferring rollers 12 along the first path 13. When the leading edge of the document P1 is detected by the separating sensor 15, the controller 50 controls the feeding clutch 55 to stop transmitting of the driving force and causes the roller 10a to be rotated by the fed document. Thereby, a misfeeding of the document is avoided.

When the leading edge of the document P1 is detected by the synchronizing sensor 28, the feeding motor 51 is stopped tentatively. When a synchronizing signal sent from the copy machine is input to the controller 50, the feeding motor 51 is started rotating again to feed the document by the pair of the transferring rollers 12. The exposing lamp 4 is actuated during passing through the slit glass 2 of the document P1 so that the first side of the document is read optically by the exposing lamp 4.

After that, the controller 50 controls the driving of the ejecting roller 18 and energizes the switching solenoid 54 to move the same toward the position illustrated by the solid line shown in FIG. 1. Thereby, the document which has been completed reading thereof is further fed by the pair of rollers 16 along the second path 17. After that, the static electricity on the document is discharged by the brush 27, and, finally, the document is ejected onto the ejection tray 20 by both the ejecting roller 18 and the first follower roller 19.

Hereinafter, the duplex mode is explained. In the duplex mode, the controller 50 never energizes the switching solenoid 54 (see FIG. 2). Therefore, the document having been read on one side thereof is fed by both the ejecting roller 18 and the first follower roller 19 toward the switch-back path 22 through the switching gate 21, which is positioned as illustrated by the dotted line (see FIG. 1). The document on the switching path 22 is transferred back and forth by the pair of switch-back rollers 25 driven forwardly and reversibly by the switch-back motor 56.

When the trailing edge of the document is detected by the ejection sensor 29, the controller 50 starts counting the rotation of the ejection motor 53. If the controller 50 has counted up to the predetermined degree, which corresponds to the feeding length L1, starting from the ejection sensor 29, the controller 50 stops the rotation of both the ejection motor 53 and the switch-back motor 56 to stop feeding of the document (see FIG. 3).

Figure 3:
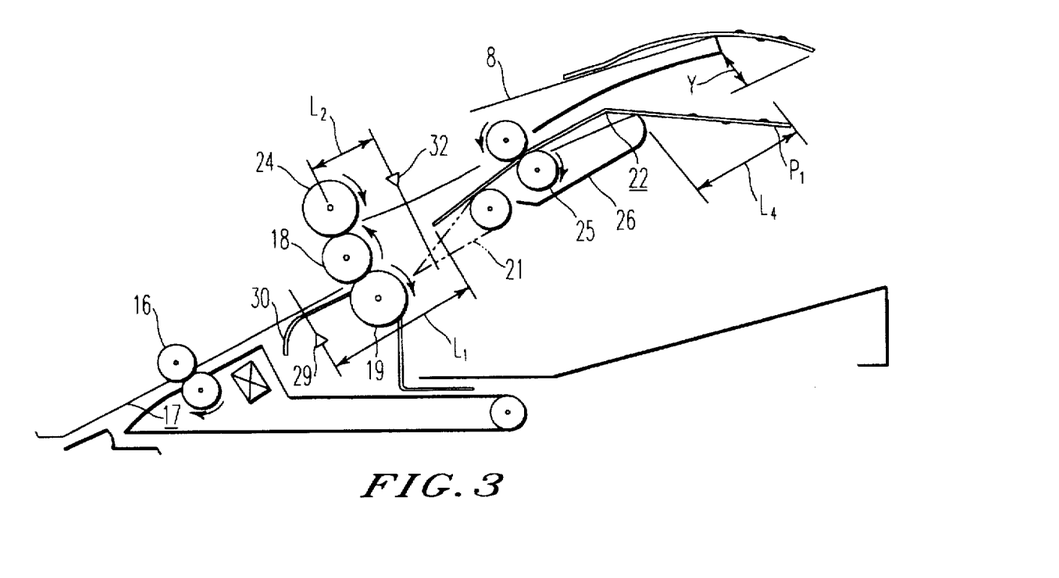
FIG. 3 illustrates the status of the document on the switch-back path.

The above mentioned control of feeding of predetermined length L1 can alternatively be executed by using the signal made by the switch-back sensor 32 generated when the trailing edge of the document is sensed by thereof. In any way, the document having been stopped feeding is grasped by the pair of the switch-back rollers 25 and the leading edge thereof is extruding from the guiding plate 26 by the length of L4. The document table 8 is shorter than the set document, thereby the trailing edge thereof is drooping from the table 8. The guiding plate 26 is disposed within a width of the document table 8, namely the plate 26 is shorter than the table 8 by the length of L4. Therefore, the leading edge of the document is also drooping from the switch-back guide plate 26. Therefore, the leading edge thereof never contacts the trailing edge of the document drooping from the document table 8. Thereby, the switching back feeding of the document on the guide plate 26 is smoothly executed.

Figure 4:
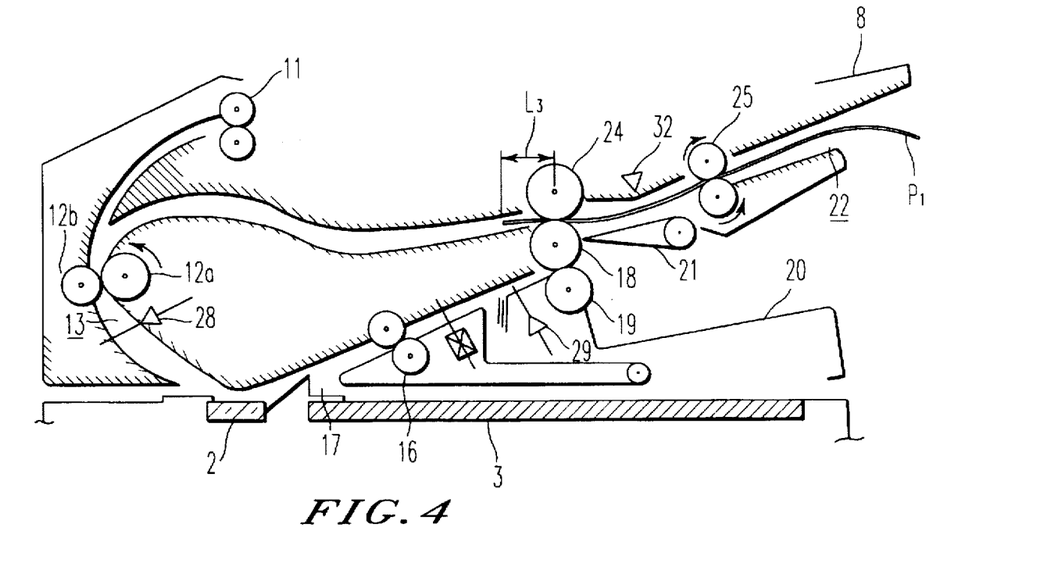
FIG. 4 shows the transportation of the document on the early part of the second path.
Figure 7A:
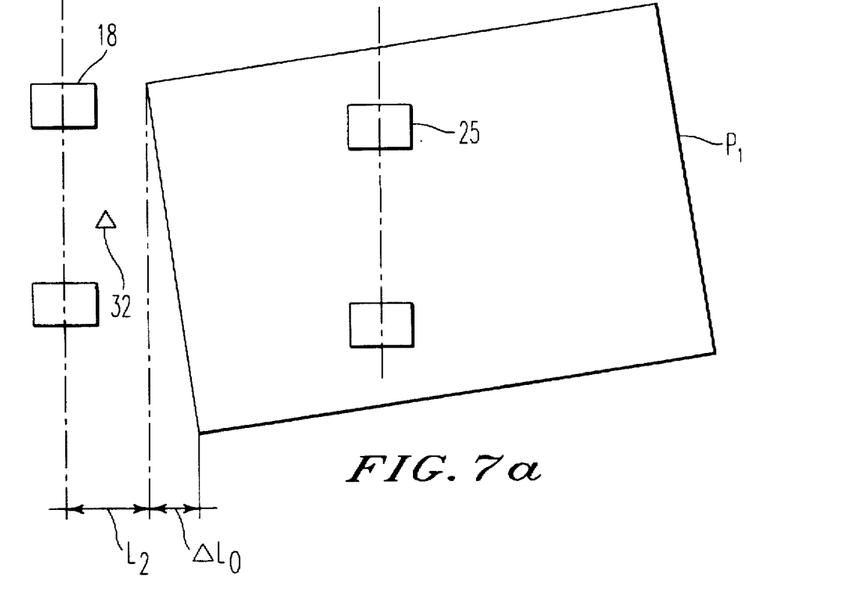
FIGS. 7(a) and 7(b) illustrate a skewed document on the switch-back path and the corrected position of the skewed document.
Figure 7B:
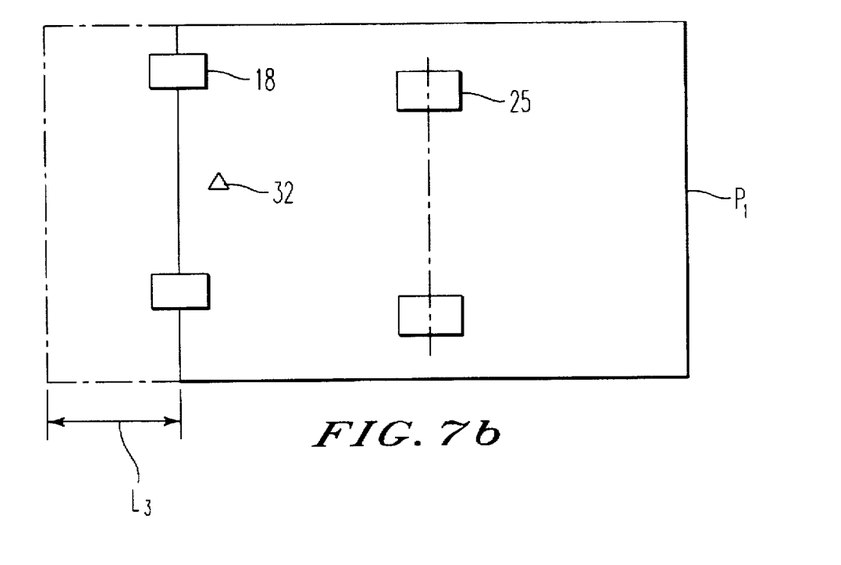

After that, the controller 50 causes driving of the switch-back motor 56 in a reverse direction, and the positioning of the switching gate 21 from the position as illustrated by the dotted line to that of the solid line as shown in FIGS. 1 and 4. Thereby, the document is fed by the pair of switch-back rollers 25 from the switch-back path 22 to the inverting path 23. At the time, the controller 50 never causes driving of the feeding motor 51. Therefore, the document P1 being switched back by the rollers 25 is stopped in a manner that the leading edge thereof is contacted with a nip formed between the ejecting roller 18 and the second follower roller 24. At this time, a skew of the document is corrected. This is because, the rotation of the pair of rollers 25 is stopped after a predetermined period during when the leading edge of the document P1 passes the ejecting roller 18, which is then stopped and made over-running by the document P1. Namely, as shown in FIG. 7(a), if a skew having an amount of L0 length has occurred upstream of the ejecting roller 18, the transportation of the document by the pair of the rollers 25 is continued until when the leading edge thereof may reach the position downstream of the ejecting roller 18 by the length L3 (See FIG. 4). The above correcting of the document skew is alternatively realized by only contacting the leading edge of the document with the nip made between the ejecting roller 18 and the second follower roller 24.

Figure 5:
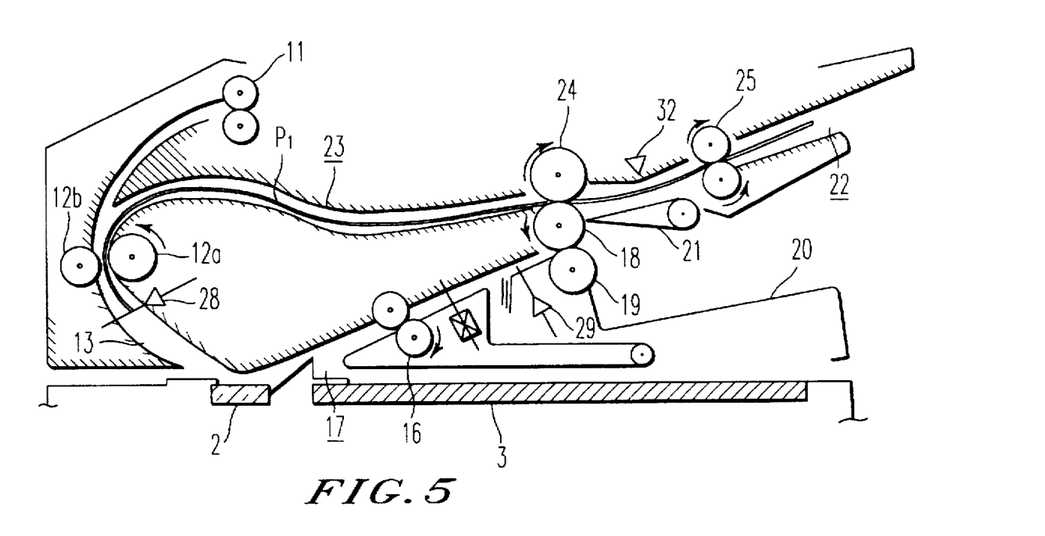
FIG. 5 shows the transportation of the document on the last part of the second path.

After that, the controller 50 causes driving of the feeding motor 51 to re-start feeding of the document P1 by both the ejecting roller 18 and the second follower roller 24. Thereby, the document P1 is further transported through the inverting path 23 and enters into the first feeding path 13 and further fed toward the slit glass 2 by the pair of transporting rollers 12. When the leading edge of the document P1 is detected by the synchronizing sensor 28, the feeding motor 51 is tentatively stopped. When the controller 50 is input a synchronized timing signal, not shown in the figure, from the copier machine 1, the controller 51 causes driving of the feeding motor again to re-feed the document by the pair of feeding rollers 12. Then, the second side of the document P1 is read by the scanning lamp 4 then energized by the copier controller, not shown in the figures.

Figure 6:
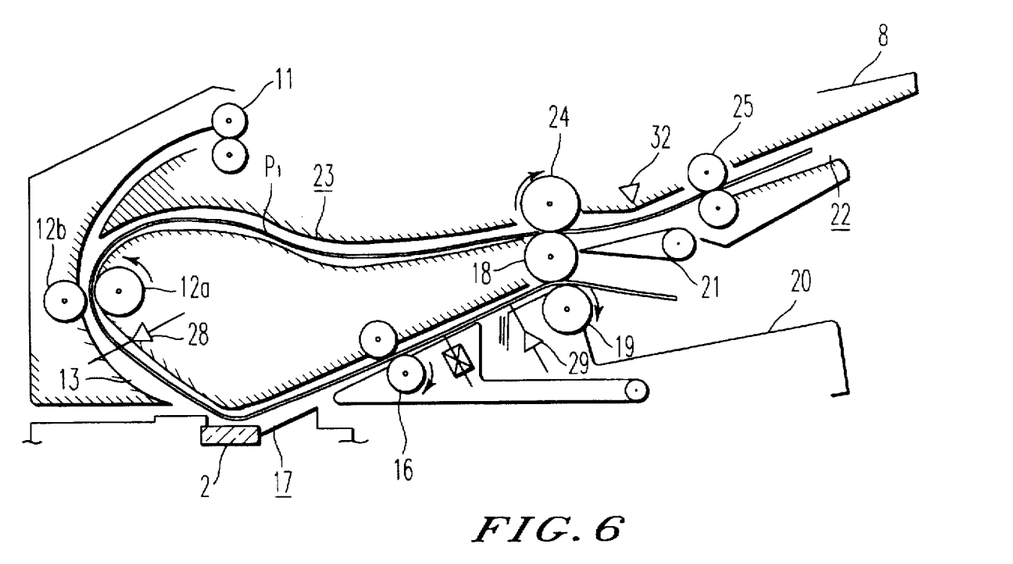
FIG. 6 shows the transportation of the document when the second side of the document is read by the slit glass.

After that, the document is fed onto the switch-back path 22 through the gate 21 which is positioned as illustrated by the dotted line. After that, when the trailing edge of the document is detected by the sensor 32, the controller 50 causes the reverse rotation of the switch-back rollers 25 so that the document is switch backed and transferred into the inverting path 23. The document is further fed through the contact glass 2 without being exposed by the exposure lamp 2 and further fed forwardly. When the sensor 29 detects the leading edge of the document, the controller 50 causes energizing of the solenoid 54 to switch the position of the switching gate 21 from the position as illustrated by the dotted line to that of the solid line as shown in FIG. 6. Therefore, the document P1 being completed reading of both sides by the lamp 4 is fed along the second feeding path 17 and discharged by the brush 27, and finally ejected onto the document ejecting tray 20 by both the ejecting roller 18 and the first follower roller 19. Thereby, the document L1 having been ejected on the ejecting tray 20 is stacked in order of the pages as set on the document setting table 8.

Figure 8:
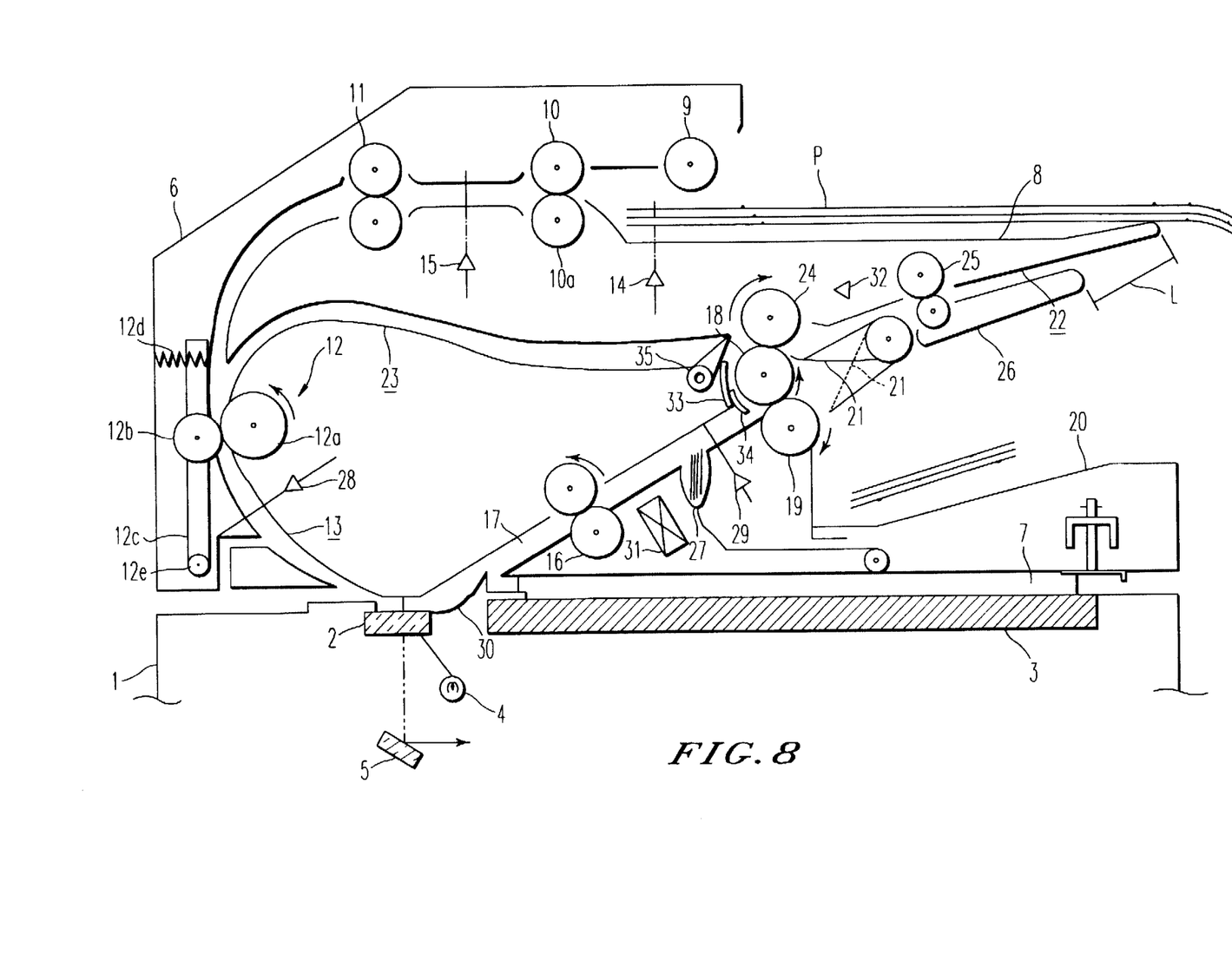
FIG. 8 is a cross sectional view of another embodiment of the present invention.

The above mentioned last document transportation can be alternatively performed by another embodiment of the present invention as explained below. Namely, as shown in FIG. 8, a bypass guide 33 is disposed at the left side of the ejecting roller 18 so that a bypass is formed adjacent to the ejecting roller 18. A second switching gate 35 is pivotably disposed at the beginning position of the inverting pass 23.

A flexible plate 34 is connected with the downside edge of the bypass guide 33 and one edge thereof contacts with a surface of the ejecting roller 18. Thereby, the document having been read on both sides thereof is further fed from the switch-back pass 22, the one edge of the second switching gate 35 enters into the inverting path 23 so that the gate 35 leads the document into the bypass 33. After that, the document is lead between the nip made between the ejecting roller 18 and the first follower roller 19. Finally, the document is ejected onto the ejecting tray 20, because at the time, the switching gate 21 has changed position thereof from the dotted position to the solid position. According to the above mentioned structure of the bypass 35, the document fed from the contact glass 2 is never mislead into the bypass 35. This is because the flexible plate 34 allows an entry into the nip made between the ejecting roller 18 and the first follower roller 19 but refuses the entrance of the document into the bypass backwardly.

Hereinafter, the relation of the length of the second feeding path 17 plus the third feeding path 23 and a document size used by an operator is explained. A total length of the above-mentioned second feeding path 17 plus the third feeding path 23 can be designed to be shorter than that of a size of the document used by an operator. This is because, in the second side document reading, if a leading edge thereof arrives at the ejecting roller 18 during the switching back process of the document on the switch-back path 22, namely, a trailing edge of the same document is remaining at the ejecting roller 15, the ejecting process thereof is not obstructed by the switching back feeding process due to two transporting periphery on the ejecting roller 18. Thereby, switching back and ejecting the same document is overlappingly executed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. An auto-document feeder for an image forming apparatus having at least a platen glass and document reading means for a duplex document, the auto-document feeder comprising:

a document setting table on which said duplex document is set in order of the pages thereof;

a separating and feeding means for separating documents set on said document setting table and feeding said document forward from an upmost document thereon;

a first feeding path extending from said document setting table to said platen glass for leading and turning said document;

an ejecting tray for receiving said document after both sides of the document have been read by said document reading means;

ejecting rollers for ejecting said document onto said ejecting tray;

a second feeding path extending from said platen glass to said ejecting rollers;

a switch-back path for receiving said document from said second path, the switch-back path having switch-back rollers therein;

a switching gate for switching a feeding direction of said document to either said switch-back path or said ejecting tray; and a third feeding path for leading said document from said switch-back path to a part of said first feeding path;

wherein said switching gate is disposed downstream of the ejecting roller and above said ejecting tray.

2. An auto-document feeder for an image forming apparatus as claimed in claim 1, further comprising:

inverting rollers disposed at a beginning of said third feeding path for feeding a document having been switch backed on said switch-back path into said third feeding path.

3. An auto-document feeder for an image forming apparatus as claimed in claim 1, wherein:

said ejecting rollers include a driving roller, which rotates in a predetermined direction and a first follower roller which contacts with a lower periphery of said driving roller and is rotated by said driving roller.

4. An auto-document feeder for an image forming apparatus as claimed in claim 3, wherein:

said inverting rollers include said driving roller and a second follower roller contacting with an upper periphery of said driving roller and is rotated by said driving roller.

5. An auto-document feeder for an image forming apparatus as claimed in claim 1, wherein:

a total length of said second path and said third path is shorter than a length of one of sizes of said document used by an operator in said auto-document feeder.

6. An auto-document feeder for an image forming apparatus as claimed in claim 1, wherein:

said switch-back path is formed by a plate member disposed downstream of said switching gate and above said ejecting tray, and below a lower surface of said auto-document feeder, and includes a pair of reversibly rotatable switching rollers therein.

7. An auto-document feeder for an image forming as claimed in claim 1, further comprising:

a switching gate controller for controlling positions of said switching gate in a manner that if a document is to be switched-back on said switch-back path, said switching gate is positioned in a first position where said document is lead from said second path to said switch-back path, and if said document is returned to said platen glass, said switching gate is positioned at a second position where a document having been switched-back is lead from said switch-back path to said third feeding path, and if, said document having been read on both sides is to be ejected, said switching gate is positioned at a third position to lead said document onto said ejecting tray.

8. An auto-document feeder for an image forming apparatus as claimed in claim 6, wherein:

said switch-back path formed by said plate member is disposed within a width of said document setting table.

9. An auto-document feeder for an image forming apparatus as claimed in claim 1, wherein:

a length of said document setting table is shorter than one of sizes of said document used by an operator.

10. An image forming apparatus comprising:

an image forming machine for forming a duplex or simplex copy, the image forming machine having a slit glass platen and a wide glass platen both on top of said image forming machine and a reading means for reading a document on said slit glass platen or wide glass platen;

an auto-document feeder for a duplex document having a document setting table on which said duplex document is set in order of the pages thereof;

a separating and feeding means for separating documents set on said document setting table and feeding said document forward from an upmost document thereon;

a first feeding path extending from said document setting table to said platen glass for leading and turning said document;

an ejecting tray for receiving said document after both sides thereof have been read by said reading means;

a pair of ejecting rollers for ejecting said document onto said ejecting tray;

a second feeding path extending from said platen glass to said pair of ejecting rollers;

a switch-back path for receiving said document from said second path disposed downstream of said ejecting rollers and above said ejecting tray, and which has a pair of switch-back rollers therein;

a switching gate for switching a feeding direction of said document either to said switch-back path or said ejecting tray and which is disposed downstream of the ejecting roller and above said ejecting tray; and a third feeding path for leading said document from said switch-back path to a part of said first feeding path;

wherein said ejecting tray, said switch-back path and said document setting table are disposed above said wide glass platen.

11. An auto-document feeder for a duplex document as claimed in claim 1, further comprising:

a duplex document feeding mode, in which documents set on said document setting table in order of pages in a state of a last page facing up is fed successively from the upmost document through said first feeding path and said second feeding path for a first side document reading, said document is thereafter fed through said switch-back path, said third feeding path, said first feeding path, and said second feeding path for a second side document reading, said document having been read on both sides thereof is thereafter fed through said switch-back path and said third, said first and said second paths for inverting said document, and said document is thereafter ejected onto said ejecting tray in order of the pages.

12. An auto-document feeder for a duplex document comprising:

a document setting table on which said duplex document is set in order of pages thereof;

a separating and feeding means for separating documents set on said document setting table and feeding said document forward from an upmost document thereon;

a first feeding path extending from said document setting table to a platen glass for leading and turning said document;

an ejecting tray for receiving said document after both sides thereof have been read by said reading means;

ejecting rollers for ejecting said document onto said ejecting tray;

a second feeding path extending from said platen glass to said ejecting rollers;

a switch-back path for receiving said document from said second path, and which has a switch-back rollers therein;

a first switching gate for switching a feeding direction of said document to either said switch-back path or said ejecting tray and is disposed downstream of the ejecting roller and above said ejecting tray;

a third feeding path for leading said document from said switch-back path to a part of said second path and which is disposed around said ejecting rollers; and a second switching gate for switching a feeding direction of a document fed from said switch-back path and lead said document into said third feeding path.

13. An auto-document feeder for a duplex document as claimed in claim 12, wherein:

said third feeding path is formed by a guiding plate disposed around said driving roller.

14. An auto-document feeder for a duplex document as claimed in claim 13, further comprising:

a flexible plate connected to an exit part of said guiding plate and a leading edge of which is positioned adjacent to said driving roller.

* * * * *